US007650488B2

(12) United States Patent
Foong et al.

(10) Patent No.: US 7,650,488 B2
(45) Date of Patent: Jan. 19, 2010

(54) COMMUNICATION BETWEEN PROCESSOR CORE PARTITIONS WITH EXCLUSIVE READ OR WRITE TO DESCRIPTOR QUEUES FOR SHARED MEMORY SPACE

(75) Inventors: Annie Foong, Aloha, OR (US); Bryan E. Veal, Hillsboro, OR (US); Arun Raghunath, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 6 days.

(21) Appl. No.: 12/141,725

(22) Filed: Jun. 18, 2008

(65) Prior Publication Data
US 2009/0319705 A1    Dec. 24, 2009

(51) Int. Cl.
*G06F 15/167* (2006.01)
(52) U.S. Cl. .................. 712/225; 709/213; 711/152
(58) Field of Classification Search .................. None
See application file for complete search history.

(56) References Cited

U.S. PATENT DOCUMENTS

| | | | | |
|---|---|---|---|---|
| 6,088,770 | A * | 7/2000 | Tarui et al. ............... | 711/148 |
| 6,314,501 | B1 * | 11/2001 | Gulick et al. ............. | 711/153 |
| 6,516,372 | B1 * | 2/2003 | Anderson et al. ........ | 710/300 |
| 6,598,123 | B1 | 7/2003 | Anderson et al. | |
| 7,277,994 | B2 * | 10/2007 | Gostin et al. ............. | 711/147 |
| 2003/0149844 | A1 * | 8/2003 | Duncan et al. ........... | 711/141 |
| 2008/0282256 | A1 * | 11/2008 | Misra ....................... | 719/312 |
| 2009/0182967 | A1 * | 7/2009 | Cardona et al. .......... | 711/165 |

OTHER PUBLICATIONS

Lamport, Leslie "Specifying Concurrent Program Modules", SRI International, ACM Transactions on Programming Languages and Systems, 5(2), (Apr. 1983),190-222.
Day, Brad "Server Workload Consolidation Â? Evaluation of Unix Systems Partitioning", Planning Assumption, (Jul. 5, 2002), 8 pgs.
"Solaris Networking—The Magic Revealed", http://blogs.sun.com/sunay/date/20051114, (Nov. 14, 2005), 36 pgs.
McCurdy, Collin et al., "User-Controllable Coherence for High Performance Shared Memory Multiprocessors", (Jun. 2003),11 pgs.

(Continued)

*Primary Examiner*—Kenneth S Kim
(74) *Attorney, Agent, or Firm*—Christopher K. Gagne

(57) ABSTRACT

In an embodiment, a method is provided that may include providing a first address space exclusively and coherently accessible by a first processor core partition in a platform. A second address space may be provided in this embodiment that is exclusively and coherently accessible by a second processor core partition in the platform. Also in this embodiment, a third address space in the platform may be provided that is accessible, at least in part, by both the first and second processor core partitions and may be to permit communication between the first and second processor core partitions of at least one packet and at least one descriptor associated with the at least one packet. The at least one descriptor may indicate, at least in part, one or more locations in the third address space to store, at least in part, the at least one packet. Of course, many alternatives, modifications, and variations are possible without departing from this embodiment.

30 Claims, 6 Drawing Sheets

OTHER PUBLICATIONS

"Delivering the Promise of Multicore Processors", Tilera, Embedding Multicore, (2007), 4 pgs.

"Creating and Controlling Jails", Chapter 15.4, FreeBSD Handbook, Retrieved on Jun. 18, 2008, Available at:-http://www.freebsd.org/doc/en_US.ISO8859-1/books/handbook/jails-build.html.

Giacomoni, John et al., "FastForward for Efficient Pipeline Parallelism: A Cache-Optimized Concurrent Lock-Free Queue", Proceedings of the 13th ACM SIGPLAN Symposium on Principles and Practice of Parallel Programming, Feb. 20-23, 2008, Salt Lake City, Utah, USA, pp. 43-52.

"Fine Tuning and Administration", Chapter 15.5, FreeBSD Handbook, Retrieved on Jun. 18, 2008, Available at:-http://www.freebsd.org/doc/en_US.ISO8859-1/books/handbook/jails-tuning.html.

"Jails", Chapter 15, FreeBSD Handbook, Retrieved on Jun. 18, 2008, Available at:-http://www.freebsd.org/doc/en_US.ISO8859-1/books/handbook/jails.html.

"Jails—Introduction", Chapter 15.3, FreeBSD Handbook, Retrieved on Jun. 18, 2008, Available at:-http://www.freebsd.org/doc/en_US.ISO8859-1/books/handbook/jails-intro.html.

"Quad-core for servers", Quad-Core: By Popular Demand, Intel, Retrieved on Jun. 18, 2008, 2 Pages.

"Terms Related to Jails", Chapter 15.2, FreeBSD Handbook, Retrieved on Jun. 18, 2008, Available at:-http://www.freebsd.org/doc/en_US.ISO8859-1/books/handbook/jails-terms.html.

"About Tilera", Tilera—Embedding Multicore, Tilera Corporation, Retrieved on Apr. 21, 2008, Available at:-http://www.tilera.com/company/about_us.php.

"Tile64(TM) Processor Family", Tilera—Embedding Multicore, Tilera Corporation, Retrieved on Apr. 21, 2008, 3 Pages.

Victor, Jeff et al., "Zones and Containers FAQ", OpenSolaris, Retrieved on Jun. 18, 2008, Available at:-http://www.opensolaris.org/os/community/zones/faq/.

Gerzo, "Service Jails", Chapter 15.6.1, FreeBSD Handbook, Retrieved on Jun. 18, 2008, Available at:-http://www.freebsd.org/doc/en_US.ISO8859-1/books/handbook/jails-application.html.

Chen, Yung-Chin et al.", Comparison and Analysis of Software and Directory Coherence Schemes", Proceedings of the 1991 ACM/IEEE conference on Supercomputing, Albuquerque, New Mexico, United States, 1991, pp. 818-829.

* cited by examiner

COMMUNICATION BETWEEN PROCESSOR CORE PARTITIONS WITH EXCLUSIVE READ OR WRITE TO DESCRIPTOR QUEUES FOR SHARED MEMORY SPACE

FIELD

This disclosure relates to communication between processor core partitions.

BACKGROUND

One conventional computer platform includes a plurality of processor cores and a single memory space that is shared among all of the processor cores. The processor cores may be coherently partitioned into a plurality of virtual computing domains, and managed by a virtualization program executed in the platform. The platform hardware maintains memory consistency for this single memory space.

Unfortunately, in this conventional arrangement, memory coherency bandwidth requirements lead to contention issues among the processor cores. This places a limit on the performance a platform can deliver, making it difficult to improve performance by increasing the number of cores.

In another conventional arrangement, the parameters of the computing domains, such as, the number of such domains and the processor cores assigned to them are implemented and statically enforced in hardware. As a result, modification of these parameters does not become completely effective unless a reset of the platform, involving reboot of the operating system, is executed.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
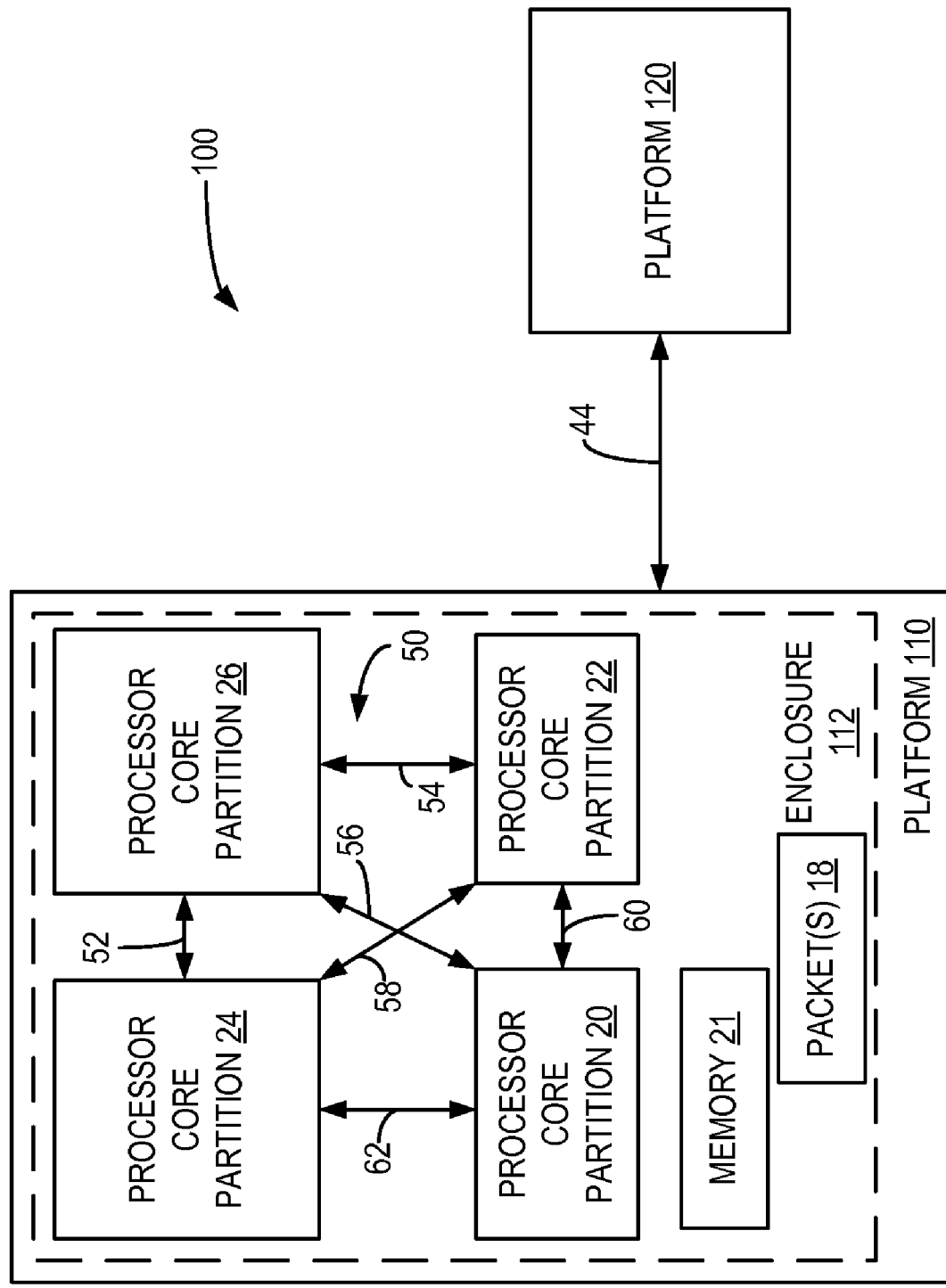
FIG. 1 illustrates a system embodiment.

FIG. 1 illustrates a system embodiment 100. System 100 comprises computer platform 110 that is coupled to computer platform 120 via one or more network communication links 44. Platform 110 may have the same construction and/or operation as platform 120. Alternatively, platform 120 may have, in whole or in part, a different construction and/or a different operation from platform 110. Platform 110 and/or platform 120 may be respective server and/or client computers, for use in massively parallel computing environments and/or tasks, although many alternatives are possible without departing from this embodiment.

Platform 110 may comprise a plurality of processor core partitions 20, 22, 24, and 26. In this embodiment, partitions 20, 22, 24, and 26 may be communicatively coupled to each other via a point-to-point packet communication network 50. Network 50 may comprise respective sets of one or more point-to-point packet communication links 52, 54, 56, 58, 60, and 62 that may communicatively couple respective pairs of processor core partitions. As used herein, a "packet" means one or more symbols and/or values. Also as used herein, a "point-to-point network" means a network capable of communicatively coupling two end devices, and may (but is not required to) include one or more intermediate devices interposed between the two end devices.

For example, one or more links 52 may communicatively couple partition 24 to partition 26. One or more links 54 may communicatively couple partition 26 to partition 22. One or more links 56 may communicatively couple partition 20 to partition 26. One or more links 58 may communicatively couple partition 22 to partition 24. One or more links 60 may communicatively couple partition 20 to partition 22. One or more links 62 may communicatively couple partition 20 to partition 24. Alternatively or additionally, without departing from this embodiment, network 50 may comprise other types and/or configurations of communication networks that may communicatively couple the partitions 20, 22, 24, and 26. Also without departing from this embodiment, the number, construction, and configuration of the respective sets of one or more links 52, 54, 56, 58, 60, and 62, and the number, construction, and configuration of the partitions 20, 22, 24, and 26 may differ from that described herein.

As used herein, a "processor core partition" means an association of one or more processor cores with one or more address spaces. In this embodiment, each processor core partition may comprise a respective set of one or more processor cores, memory, and other devices wherein memory coherency may be maintained between or among the one or more processor cores within the boundary of the respective partition. Also in this embodiment, memory coherency may not be maintained between or among processor cores of different processor core partitions, and two or more processes executing within different processor core partitions may not be able to rely (and in fact do not rely) upon the existence of such memory coherency to communicate.

As used herein, a "processor core" means circuitry capable of performing, at least in part, one or more arithmetic and/or logical operations. Also as used herein, an "address space" may comprise one or more contiguous and/or non-contiguous logical and/or physical regions of computer readable (and/or writeable) memory.

In this embodiment, each respective processor core partition may comprise a respective private address space that may be exclusively and coherently accessible by only that respective processor core partition. In this embodiment, memory coherency of a respective private address space of a respective processor core partition may be maintained, at least in part, by one or more hardware mechanisms comprised in the platform such that one or more most recent values residing in one or more locations in the respective private address space may be consistently read by one or more processor cores (and/or other devices) comprised in the respective processor core partition, without regard to which processor core (and/or other device) most recently wrote to these one or more locations.

As used herein, "circuitry" may comprise, for example, singly or in any combination, analog circuitry, digital circuitry, hardwired circuitry, programmable circuitry, state machine circuitry, and/or memory that may comprise program instructions that may be executed by programmable circuitry. Additionally, as used herein, first device may be "communicatively coupled" to a second device if the first device is capable of transmitting to and/or receiving from the second device one or more signals. "Memory" may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writeable memory.

Platform 110 also may include computer-readable and/or writable memory 21. Although not shown in FIG. 1, memory 21 may be communicatively coupled to each of the partitions 20, 22, 24, and 26. Alternatively, platform 110 may not comprise memory 21 without departing from this embodiment.

In this embodiment, platform 110 may comprise a single physical housing or enclosure 112 (e.g., a chassis) that contains the partitions 20, 22, 24, and 26, network 50, and memory 21. Alternatively, the components of platform 110 may be comprised in a plurality of physical housings and/or enclosures without departing from this embodiment.

Figure 2:
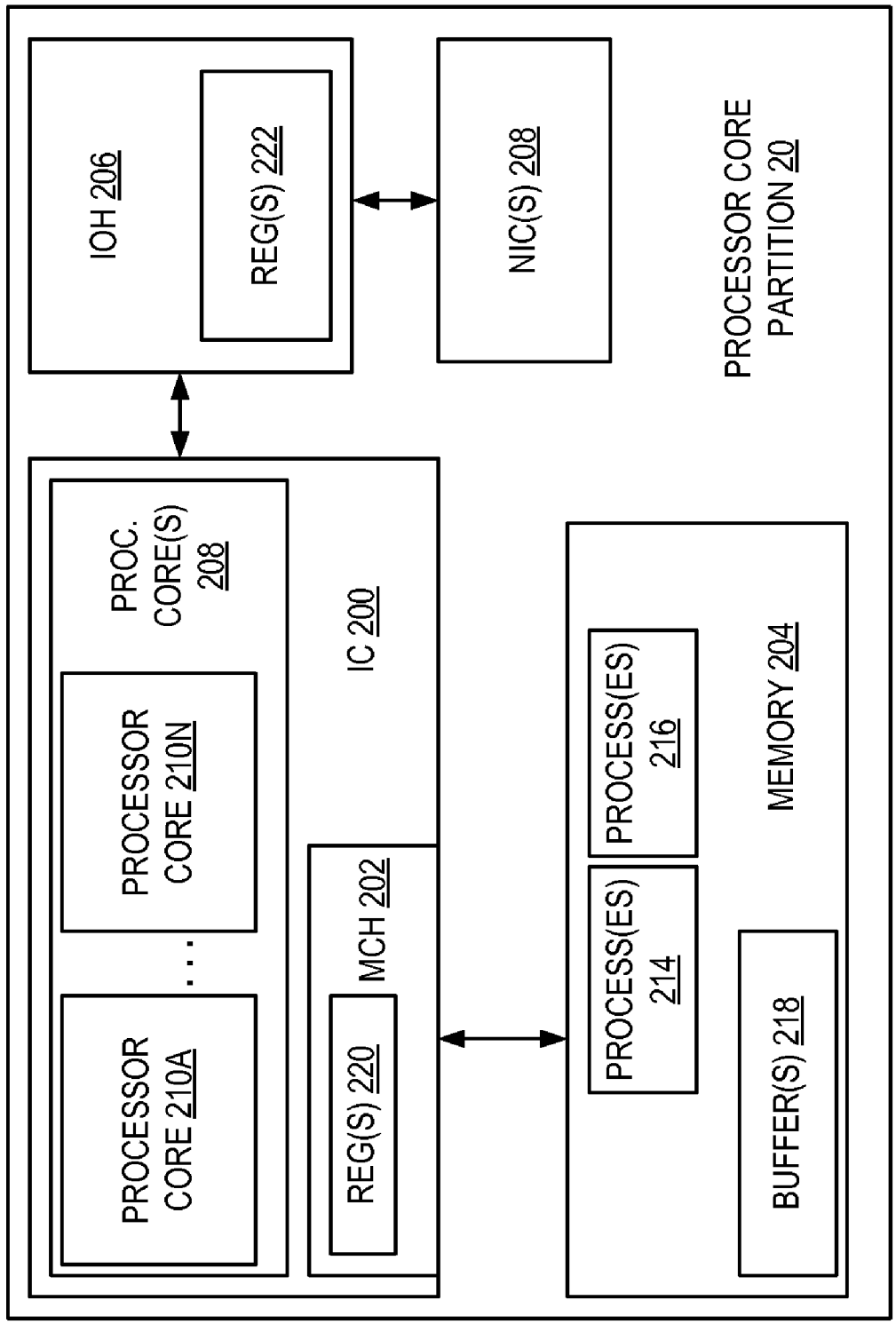
FIG. 2 illustrates a processor core partition according to an embodiment.

FIG. 2 illustrates an embodiment of processor core partition 20. Partition 20 may include one or more integrated circuits 200 mounted in one or more sockets (not shown). One or more integrated circuits 200 may be a single integrated circuit chip, and may include one or more processor cores 208 and memory controller hub (MCH) 202. In this embodiment, one or more processor cores 208 may include a plurality of processor cores 210A . . . 210N. The number, type, construction, and/or configuration of the processor cores 210A . . . 210N comprised in one or more processor cores 208 may vary without departing from this embodiment. As used herein, an "integrated circuit" means a semiconductor device and/or microelectronic device, such as, for example, a semiconductor integrated circuit chip.

Partition 20 also may include computer-readable memory 204 that may be communicatively coupled to integrated circuit 200 via MCH 202. Input/output hub (IOH) 206 (comprised in partition 20) may communicatively couple integrated circuit 200 to one or more network interface controllers (NIC) 208. Although not shown in the Figures, NIC 208 may communicatively couple partition 20 to platform 120 via one or more links 44.

Figure 3:
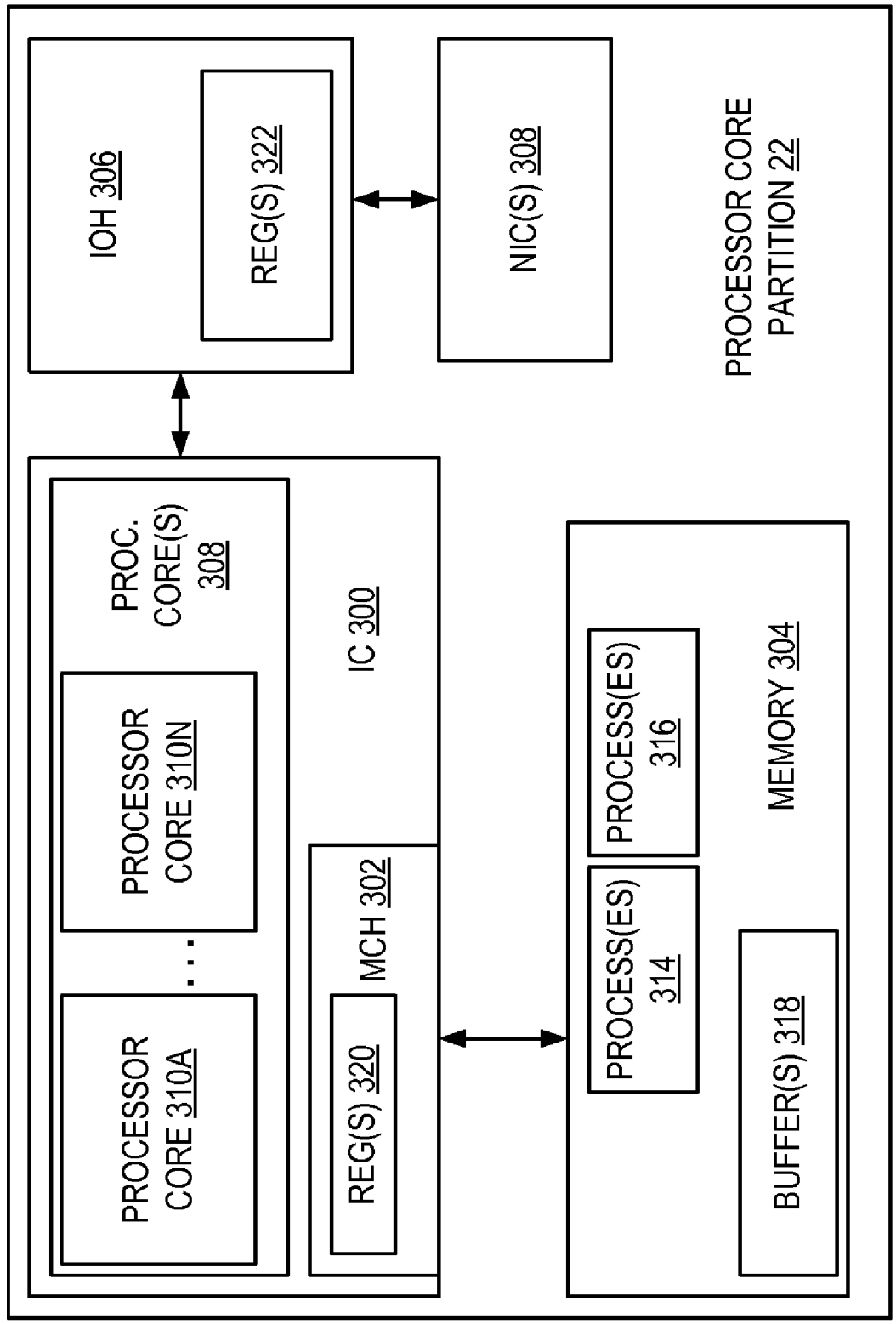
FIG. 3 illustrates another processor core partition according to an embodiment.

FIG. 3 illustrates an embodiment of processor core partition 22. Partition 22 may include one or more integrated circuits 300 mounted in one or more sockets (not shown). In this embodiment, one or more integrated circuits 300 may be a single integrated circuit chip, and may include one or more processor cores 308 and MCH 302. In this embodiment, one or more processor cores 308 may include a plurality of processor cores 310A . . . 310N. The number, type, construction, and/or configuration of the processor cores 310A . . . 310N comprised in one or more processor cores 308 may vary without departing from this embodiment.

Partition 22 also may include computer-readable memory 304 that may be communicatively coupled to integrated circuit 300 via MCH 302. Input/output hub (IOH) 306 (comprised in partition 22) may communicatively couple integrated circuit 200 to one or more network interface controllers (NIC) 308. Although not shown in the Figures, NIC 308 may communicatively couple partition 22 to platform 120 via one or more links 44.

As will be discussed below, the number, type, and/or configuration of the processor cores 210A . . . 210N may be the same as, or may differ in whole or in part from, the number, type, and/or configuration of the processor cores 310A . . . 310N without departing from this embodiment. Stated more broadly, as will be discussed below, the respective numbers, types, and/or configurations of processor cores, address spaces, and/or other components that may be comprised in the processor core partitions, as well as, the number of such partitions that may be comprised in platform 110 may vary without departing from this embodiment.

Additionally or alternatively, although in FIG. 1, respective pairs of partitions 20, 22, 24, and 26 are shown as being coupled by together via respective point-to-point communication links in network 50, depending upon the particular configuration of system 100, without departing from this embodiment, respective point-to-point packet communication links may communicatively couple respective pairs of sockets in which may be mounted one or more respective integrated circuit chips that may comprise respective sets of one or more respective processor cores. Also additionally or alternatively, one or more of the partitions may include processor cores comprised in different respective integrated circuits and/or integrated circuit chips mounted in different respective sockets.

One or more links 44 may permit the exchange data and/or commands between platform 110 and platform 120 in accordance with, e.g., an Ethernet protocol and/or Transmission Control Protocol/Internet Protocol (TCP/IP) protocol. The Ethernet protocol utilized in system 100 may comply or be compatible with the protocol described in Institute of Electrical and Electronics Engineers, Inc. (IEEE) Std. 802.3, 2000 Edition, published on Oct. 20, 2000. Alternatively or additionally, the TCP/IP protocol utilized in system 100 may comply or be compatible with the protocols described in Internet Engineering Task Force (IETF) Request For Comments (RFC) 791 and 793, published September 1981. Of course, many different communication protocols may be used for such data and/or command exchange without departing from this embodiment.

Machine-readable program instructions may be stored in computer-readable memory 204, 304, 21, and/or other computer-readable memory (not shown) that may be comprised in the other partitions 24 and 26 in platform 110. In operation of platform 110, these instructions may be accessed and executed by the processor cores comprised in platform 110. When executed by these processor cores, these instructions may result in the processor cores and other components of platform 110 and system 100 performing the operations described herein as being performed by the processor cores and these other components.

With reference now being made to FIGS. 1 to 6, operations 600 (see FIG. 6) that may be performed in system 100 according to an embodiment will be described. After, for example, a reset of system 100 and/or platform 110, a human user (not shown) of platform 110 may issue one or more commands to platform 110 via a not shown user interface. This may result in one or more of the processor cores comprised in platform 110 executing in computer-readable memory (e.g., memory 204, 304, 21, and/or other and/or additional memory comprised in platform 110) one or more partition management processes. For example, as shown in FIGS. 2 and 3, one or more processor cores 208 and/or 308 may execute one or more partition management program processes 214 and/or 216. Alternatively, one or more processor cores 208 and/or 308 may execute one or more processes 214 and/or 216 after the reset of platform 110 without the user having to issue the one or more commands.

The execution by one or more processor cores 208 and/or 308 of one or more program processes 214 and/or 314 may result in processes 214 and/or 314 defining, at least in part, partitions 20, 22, 24, and/or 26 and/or address spaces 400A . . . 400N and/or 402. For example, one or more processes 214 and/or 314 may prompt the human user to select (e.g., via the not shown user interface), at least in part, the parameters that the user may desire for the partitions (e.g., the number of partitions, and the respective numbers and configurations of respective processor cores and respective address spaces to be associated with and/or comprised in the respective partitions). Alternatively and/or additionally, the one or more processes 214 and/or 314 may select these parameters based, at least in part, upon predetermined sets of parameters determined based, at least in part, upon one or more expected usage models for the platform 110.

Thereafter, the one or more processes 214 and/or 314 may instantiate these partitions and address spaces in accordance with the selected parameters. This may be accomplished, at least in part, by the one or more processes 214 and/or 314 loading into one or more partition parameter configuration registers (e.g., in the MCH and/or IOH in platform 110, such as, for example, in one or more registers 220 and/or 320 in MCH 202 and/or 302, and/or one or more registers 222 and/or 322 in ICH 206 and/or 306, and/or one or more other not shown MCH and/or ICH registers in platform 110) one or more values that may represent and/or indicate these selected parameters and/or one or more data structures (e.g., tag values and/or tables, etc.) that may represent, embody, and/or indicate these selected parameters. In this embodiment, the one or more partition parameter configuration registers may be comprised, for example, in source address decoder circuitry and/or IO memory management unit circuitry. Many alternatives are possible, however, without departing from this embodiment.

The loading of these one or more values into these one or more partition parameter configuration registers may result, at least in part, in the association into respective processor core partitions of (1) respective sets of one or more processor cores, (2) respective private address spaces, and/or (3) other and/or additional components (e.g., IOH and/or NIC resources). For example, in this embodiment, the loading of these one or more values into these one or more registers may result in the association into respective partitions 20 and 22 of one or more processor cores 208 and 308, respectively, and private address spaces 400A and 400N, respectively. These one or more values may indicate, at least in part, that private address spaces 400A and 400N are to be exclusively accessible by the one or more processor cores 208 and 308, respectively, in the processor core partitions 20 and 22, respectively. Thus, this loading of the one or more values into the one or more registers may result in the provision in platform 110 of address spaces 400A and 400N that are exclusively accessible by processor core partitions 20 and 22, respectively, as illustrated by operations 602 and 604, respectively, in FIG. 6. The loading of these values into these one or more registers also results, at least in part, in the provision in the platform 110 of another address space 402 that is accessible, at least in part, by the processor cores in all of the partitions 20, 22, 24, and 26 (or alternatively at least by one or more processor cores 208 and 308 in partitions 20 and 22, respectively) in platform 110 (see operation 606 in FIG. 6). Additionally or alternatively, other and/or additional partition management processes (not shown) may be executed by one or more other processor cores (not shown) to be associated with other partitions (e.g., partitions 24 and 26) in platform 110 that may result in the defining, at least in part, and instantiation, at least in part, of partitions 20, 22, 24, and/or 26, and/or address spaces 400A . . . 400N and/or 402, in the manner described above in connection with processes 214 and 314.

In this embodiment, each of the respective partitions 20, 22, 24, and 26 may comprise a respective private address space that may be comprised in respective memory comprised in the respective partition. For example, in this embodiment, memory 204 in partition 20 may comprise private address space 400A, and memory 304 in partition 22 may comprise private address space 400N. Without departing from this embodiment, however, one or more of these private address spaces may be comprised, in whole or in part, in memory 21. Memory 21 may also comprise address space 402. The respective private address spaces associated with the respective partitions may be accessed exclusively by the one or more respective processor cores comprised in those respective partitions for computing tasks (e.g., executing programming treads, computing processes, etc.) executed in whole or in part by the one or more respective processor cores.

Figure 4:
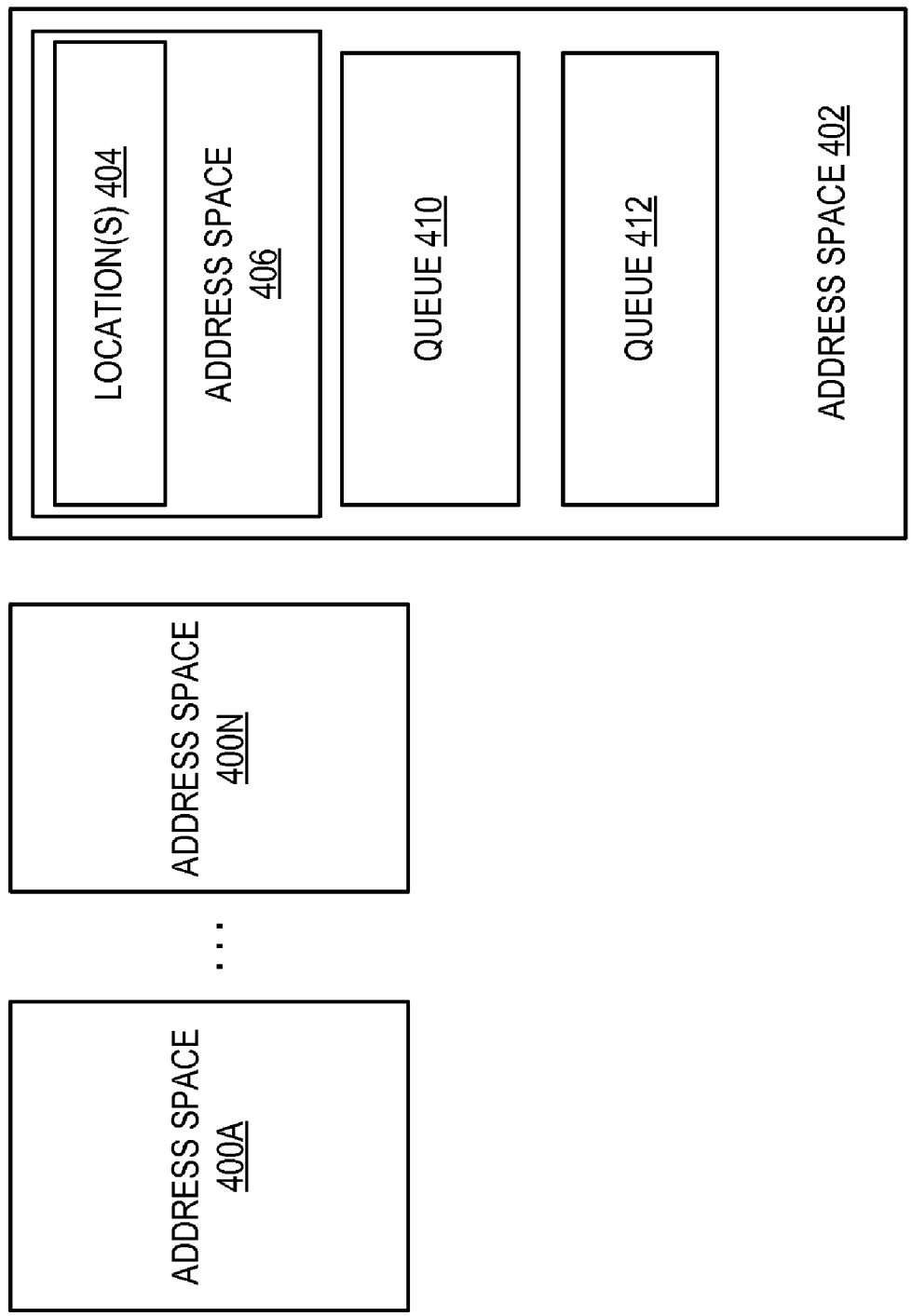
FIG. 4 illustrates address spaces according to an embodiment.

In this embodiment, as part of operation 606, additional address spaces and queues may be defined within address space 402 for the purpose of permitting communication among the partitions. More specifically, as part of operation 606, additional address spaces (equal in number to twice the number of partitions) and lock-free queues (also equal in number to twice the number of partitions) may be defined within address space 402. Each of these additional address spaces and each of these lock-free queues may be a respective single-reader/single-writer data structure, in which only a single respective partition is permitted to write to the respective data structure and only a single, different respective partition is permitted to read from the respective data structure. For example, as shown in FIG. 4, address space 402 may comprise address space 406 and lock-free queues 410 and 412. Address space 406 may be defined, as part of operation 606, to be a single-reader/single-writer data structure in which partition 20 may be the only partition in platform 110 that is permitted to write to the address space 406, and partition 22 may be the only partition in platform 110 that is permitted to read from address space 406. Queue 410 may be defined, as part of operation 606, to be a single-reader/single-writer queue in which partition 20 may be the only partition in platform 110 that is permitted to write to the queue 410, and partition 22 may be the only partition in platform 110 that is permitted to read from queue 410. Queue 412 may be defined, as part of operation 606, to be a single-reader/single-writer queue in which partition 22 may be the only partition in platform 110 that is permitted to write to the queue 412, and partition 20 may be the only partition in platform 110 that is permitted to read from queue 412.

After the execution of operations 602, 604, and 606, one or more application layer processes executed by one or more processor cores (e.g., one or more processor cores 208) in one or more partitions (e.g., partition 20) may generate data to be communicated to one or more application layer processes executed by one or more other processor cores (e.g., one or more processor cores 308) in one or more other partitions (e.g., partition 22), and may signal one or more transport layer processes (e.g., at least one transport layer process 216) to initiate the communication of the data. In response, at least in part, to the signaling by the one or more application layer processes, the at least one transport layer process 216 may segment the data into one or more packets 18, and may initiate, at least in part, the transmission of the one or more packets 18 to at least one transport layer process 316 executed by one or more processor cores 308 intended to receive the one or more packets 18. In this embodiment, processes 216 and 316 may comprise one or more respective TCP and network interface controller driver interface emulation processes. In this embodiment, such emulation processes may result from, for example, respective sets of one or more machine executable instructions respectively executed exclusively by respective sets of one or more processor cores in respective processor core partitions. Also in this embodiment, such emulation processes in a respective processor core partition may transmit to and receive from other such emulation processes in another processor core partition one or more network transport protocol packets; however, without departing from this embodiment, transmitting and receiving emulation processes may not reside in different respective processor core partitions. Many other and/or additional alternatives are possible.

The transmission of one or more packets 18 from partition 20 to partition 22, and the reception thereof by partition 22, in this embodiment will now be described in greater detail. The signaling of at least one process 216 by the one or more application processes executed by one or more cores 208 may result in at least one process 216 signaling (e.g., via one or more interrupt signals issued from partition 20 to partition 22) at least one process 316 that at least one process 216 is preparing to send to at least one process 316 one or more packets 18, and therefore, at least one process 316 is to prepare to receive the one or more packets 18. In response, at least in part, to this signaling by at least one process 216 of at least one process 316, at least one process 316 may block further execution of a corresponding user thread pending receipt of the at least one packet 18 from at least one process 216.

The execution by one or more cores 208 of at least one process 216 may result in partition 20 allocating one or more transmit socket buffers 218 in memory 204, and also may result in partition 20 allocating one or more locations 404 in address space 406. Thereafter, at least one process 316 may write one or more packets 18 into one or more buffers 218, and thereafter, the execution by one or more cores 208 of at least one process 216 result in partition 20 copying and storing, at least in part, the one or more packets 18 in the one or more locations 404.

Figure 5:
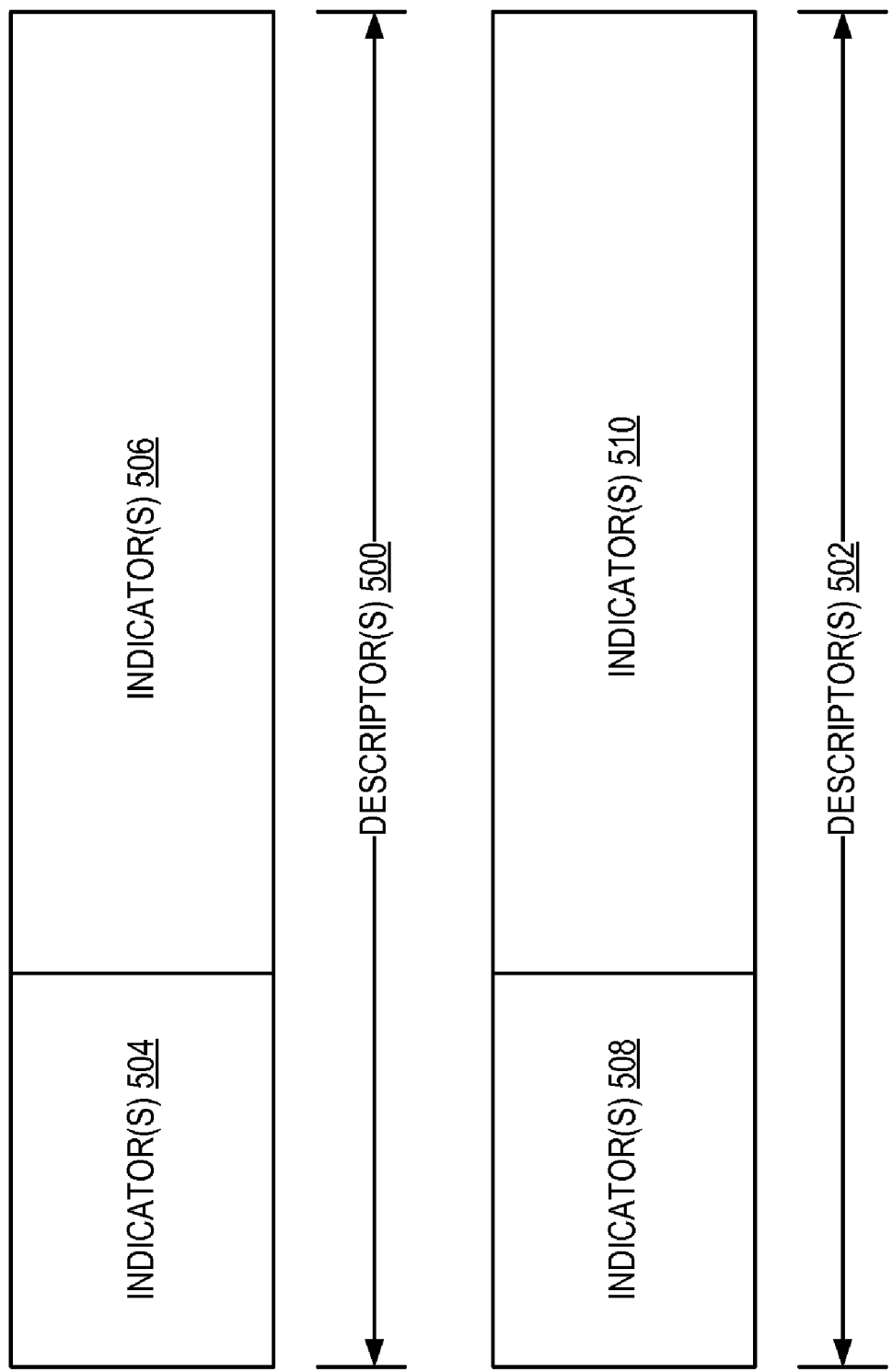
FIG. 5 illustrates descriptors according to an embodiment.
Figure 6:
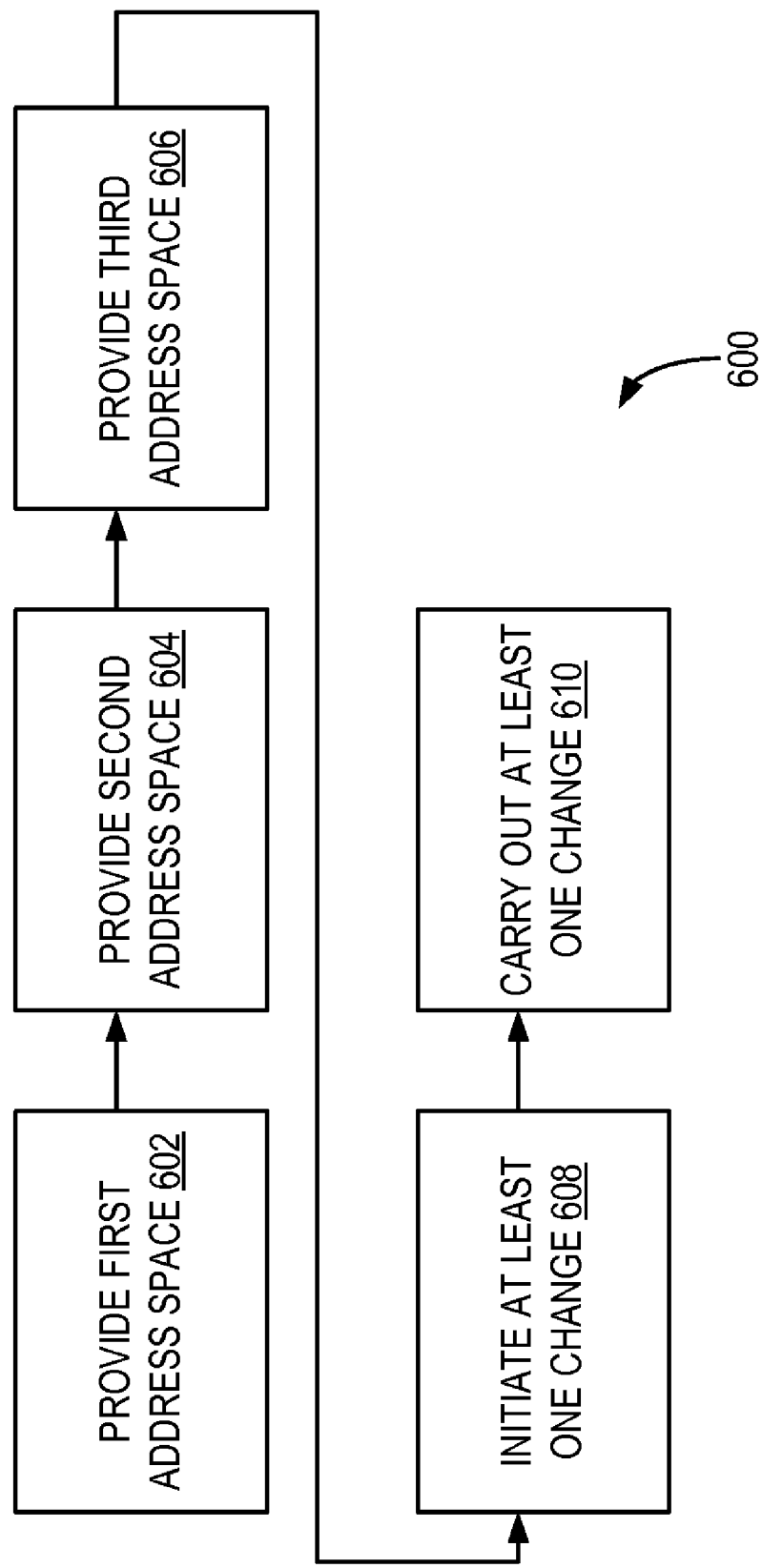
FIG. 6 illustrates operations that may be carried out according to an embodiment.

After the storing, at least in part, of the one or more packets 18 in the one or more locations 404, the execution of at least one process 216 by one or more cores 208 may result in partition 20 storing in queue 410 at least one descriptor 500 (see FIG. 5). At least one descriptor 500 may be associated with one or more packets 18, and may indicate, at least in part, the one or more locations 404 in the address space 402 in which the one or more packets 18 are stored, at least in part. More specifically, in this embodiment, at least one descriptor 500 may include one or more indicators 504 and one or more other indicators 506. One or more indicators 504 may be or comprise a flag to indicate, at least in part, whether the at least one descriptor 500 is intended to indicate, at least in part, either the storage of the least one packet 18 in the one or more locations 404 or the completion of processing of the at least one packet 18 (at least with respect to the retrieval of the at least one packet 18 from the one or more locations 404) by the one of the processor core partitions 22 that is intended to receive the at least one packet 18. One or more indicators 506 may be or comprise one or more addresses that may indicate, at least in part, the one or more locations 404 in the address space 402 in which the at least one packet 18 is located, at least in part. In this embodiment, at least one process 216 may set the one or more indicators 504 to indicate, at least in part, that the at least one descriptor 500 is intended to indicate, at least in part, the storage of the at least one packet 18 in address space 402.

After the storing of the at least one descriptor 500 in queue 410, the execution of at least one process 216 may signal (e.g., via one or more interrupt signals issued from partition 20 to partition 22) at least one process 318. In response, at least in part, to this signaling, the at least one process 316 in the partition 22 may initiate the reception by partition 22 of the at least one packet 18 by, among other things, reading from the queue 410 the at least one descriptor 500. Concurrently, at least in part, the at least one process 216 may sever linkage between the allocation of one or more buffers 218 and one or more locations 404, and may de-allocate the one or more buffers 218. Based, at least in part, upon the indicators 504 and 506, the at least one process 316 may determine, based at least in part, upon its reading of the at least one descriptor 500 that the at least one indicator 500 is intended to indicate, at least in part, the storage, at least in part, of the at least one packet 18 at one or more locations 404 in address space 402.

Thereafter, at least one process 316 may allocate one or more receive socket buffers 318 in memory 304, and may enqueue in an associated receive queue internal to partition 22 information contained in the at least one descriptor 500. The at least one process 316 may then stop blocking the execution of the corresponding user thread.

The execution of the at least one process 316 by one or more cores 308 may result in partition 22 reading from the one or more locations 404 the one or more packets 18 stored therein, at least in part. Thereafter, the at least one process 316 may copy and store, at least part, the one or more packets 18 in the one or more buffers 318. After the one or more packets 18 have been stored, at least in part, in one or more buffers 318, the execution of the one or more processes 316 by one or more cores 308 may result in partition 22 storing, at least in part, in queue 412 at least one descriptor 502, and also may result in partition 22 signaling (e.g., via one or more interrupt signals issued from partition 22 to partition 20) partition 20.

In this embodiment, at least one descriptor 502 may be associated with one or more packets 18, and may indicate, at least in part, the one or more locations 404 in the address space 402 in which the one or more packets 18 are stored, at least in part. More specifically, in this embodiment, at least one descriptor 502 may include one or more indicators 508 and one or more other indicators 510. One or more indicators 508 may be or comprise a flag to indicate, at least in part, whether the at least one descriptor 502 is intended to indicate, at least in part, either the storage of the least one packet 18 in the one or more locations 404 or the completion of processing of the at least one packet 18 (at least with respect to the retrieval of the at least one packet 18 from one or more locations 404) by the one of the processor core partitions 22 that is intended to receive the at least one packet 18. One or more indicators 510 may be or comprise one or more addresses that may indicate, at least in part, the one or more locations 404 in the address space 402 in which the at least one packet 18 is located, at least in part. In this embodiment, at least one process 316 may set the one or more indicators 508 to indicate, at least in part, that the at least one descriptor 502 is intended to indicate, at least in part, the completion of the processing of the at least one packet 18 (at least with respect to the retrieval of the at least one packet 18 from one or more locations 404).

In response, at least in part, to the signaling from the partition 22, at least one process 216 in partition 20 may read the at least one descriptor 502 from queue 410. Concurrently, at least in part, at least one processor 316 may de-allocate one or more buffers 318. Based, at least in part, upon the indicators 508 and 510, the at least one process 216 may determine, based at least in part, upon its reading of the at least one descriptor 502 that the at least one indicator 502 is intended to indicate, at least in part, the storage, at least in part, the completion of the processing of the at least one packet 18 (at least with respect to the retrieval of the at least one packet 18 from one or more locations 404). Accordingly, the execution of the one or more processes 216 by partition 20 results in partition 20 de-allocating the one or more locations 404 for storage of the one or more packets.

The above technique for communicating between partitions in this embodiment offers significant advantages. For example, in this embodiment, the packet data is copied from one or more buffers 218 to the address space 404 (which can be written to only by partition 20), and then is copied from the address space 404 to one or more buffers 318; this is in contrast to a conventional technique in which the sending domain transmits to a receiving domain a shared socket buffer that can be written to by both the sending and receiving partitions. Disadvantageously, in this conventional technique, write cache invalidations in the sending and receiving domains may result from the transmission of the mutually-writable socket buffer. Advantageously, this is avoided in system 100, as a result, at least in part, of decoupling the sharing of the actual packet data and the socket buffer among partitions.

After operations 602, 604, and 606 have been carried out in platform 110, the previously selected parameters for at least a subset of the partitions may be redefined and/or changed without having to reset the platform 110. For example, during run time operation of platform 110, as a result of, e.g., a request issued by the user via the user interface, one or more processes 214 and/or 314 may initiate at least one change, at least in part, to at least one of the partitions and/or to one or more of the address spaces 400A . . . 400N and/or 402 such that the at least one change may be capable of being carried out in platform 110 absent a reset of the platform, as illustrated by operation 608. Thereafter, the at least one change may be carried out absent a reset of the platform 110, as illustrated by operation 610. Such a change may comprise, e.g., a change in the number of partitions, respective numbers and/or configurations of respective processor cores and respective address spaces to be associated with and/or comprised in the respective partitions, change in one or more of the respective sizes of the address spaces, etc.).

As part of operation 608, one or more processes 214 and/or 314 may signal not shown operating system (OS) and/or virtual memory manager (VMM) processes to suspend and save to memory their execution states, and in response, these OS and/or VMM processes may suspend and save to memory their execution states. Thereafter, processes 214 and/or 314 may redefine, at least in part, one or more of the partitions and/or address spaces in platform 110. For example, one or more processes 214 and/or 314 may prompt the human user to select (e.g., via the not shown user interface), at least in part, the new parameters that the user may desire in effectuating one or more different partitions (e.g., a different number of partitions, different respective numbers and/or configurations of respective processor cores and respective address spaces to be associated with and/or comprised in the respective partitions, etc.). Alternatively and/or additionally, the one or more processes 214 and/or 314 may select these parameters based, at least in part, upon predetermined sets of parameters determined based, at least in part, upon one or more current and/or future expected usage of the platform 110.

Thereafter, the one or more processes 214 and/or 314 may instantiate these new partitions and/or address spaces in accordance with the newly selected parameters. This may be accomplished, at least in part, by the one or more processes 214 and/or 314 loading into one or more registers 220 and/or 320 in MCH 202 and/or 302, and/or one or more registers 222 and/or 322 in ICH 206 and/or 306 (and/or one or more other not shown MCH and/or ICH registers in platform 110) one or more values that may represent and/or indicate these newly selected parameters and/or one or more data structures (e.g., tag values and/or tables, etc.) that may represent, embody, and/or indicate these newly selected parameters.

The loading of these one or more values into these one or more registers may result, at least in part, in changing the previously defined processor core partitions into different, at least in part, respective processor core partitions (not shown) comprising different, at least in part, associations of (1) respective sets of one or more processor cores, (2) respective private address spaces, and/or (3) other and/or additional components (e.g., IOH and/or NIC resources). Additionally or alternatively, other and/or additional partition management processes (not shown) may be executed one or more other processor cores (not shown) to be associated with other partitions in platform 110 that may result in the defining, at least in part, and instantiation, at least in part, of different, at least in part, partitions and/or address spaces, in the manner described above in connection with processes 214 and 314.

After these new one or more new partitions and/or address spaces have been implemented, the one or more partition management processes may signal the OS and/or VMM processes. This may result in the OS and/or VMM processes exiting their suspended states of operation, retrieving their previously saved operational states, and continuing, in a fashion that is appropriately modified given the changes that have been made to one or more of the partitions and/or address spaces, their respective operations in accordance with the newly redefined one or more partitions and/or address spaces. Advantageously, in this embodiment, the parameters of the processor core partitions are implemented and enforced, at least in part, by one more hardware registers in the platform. As a result, modification of these parameters may become completely effective without executing a reboot of the OS or VMM. Also advantageously, such modification may be under software control (thereby increasing ease of implementation) while still permitting the ultimate implementation and enforcement to reside in hardware (thereby resulting, as stated above, in such modification to be carried out without having to reboot the OS or VMM).

Thus, in an embodiment, an apparatus is provided. The apparatus may comprise a first address space that may be exclusively and coherently accessible by a first processor core partition in a platform. In this embodiment, a second address space may be included in the platform that may be exclusively and coherently accessible by a second processor core partition in the platform. The apparatus also may comprise a third address space in the platform that may be accessible, at least in part, by both the first and second processor core partitions and may be to permit communication between the first and second processor core partitions of at least one packet and at least one descriptor associated with the at least one packet. The at least one descriptor may indicate, at least in part, one or more locations in the third address space to store, at least in part, the at least one packet.

Thus, in this embodiment, each processor core partition is associated with a respective private address space, and communication between respective pairs of partitions is facilitated by communicating at least one packet and at least one descriptor via another address space that is accessible, at least in part, by the pair of partitions. Advantageously, increasing the number of processor cores in the platform of this embodiment is easier than in prior art, since each processor core partition may exclusively utilize the respective private address space with which it is associated, thereby (1) reducing memory coherency problems and contention issues compared to the prior art, and (2) improving the performance of programs designed for execution in a single processor environment. Further advantageously, by not having a single shared coherent memory space utilized by all partitions the complexity of the platform hardware and inter-processor core interconnects may be reduced, thereby reducing the cost, power consumption, and complexity of the platform of this embodiment compared to the prior art.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. An apparatus comprising:
    a first memory address space exclusively and coherently accessible by a first processor core partition in a platform, the first processor core partition including one or more processor cores;
    a second memory address space exclusively and coherently accessible by a second processor core partition in the platform, the second processor core partition including one or more other processor cores; and
    a third memory address space in the platform that is accessible, at least in part, by both the first and second processor core partitions and permitting communication between the first and second processor core partitions of at least one packet and at least one descriptor associated with the at least one packet, the at least one descriptor indicating, at least in part, one or more locations in the third address space to store, at least in part, the at least one packet, the third address space including single-reader/single-writer queues, at least one of the queues to store the at least one descriptor, the queues including first and second single-reader/single-writer queues, the first processor core partition being exclusively permitted to read from the first single-reader/single-writer queue, the second processor core partition being exclusively permitted to read from the second single-reader/single-writer queue.

2. The apparatus of claim 1, wherein:
    the apparatus further comprises the platform;
    the platform includes the first, second, and third address spaces; and
    the first processor core partition includes a plurality of processor cores to coherently access the first address space.

3. The apparatus of claim 1, wherein:
    the first processor core partition includes a first processor core, a first memory that comprises the first address space, a first memory controller associated with the first memory, and a first input/output (I/O) hub;
    the second processor core partition includes a second processor core, a second memory that comprises the second address space, a second memory controller associated with the second memory, and a second I/O hub; and
    the platform comprises a point-to-point packet communication network to communicatively couple the first processor core partition to the second processor core partition.

4. The apparatus of claim 1, further comprising:
    at least one process to initiate at least one change, at least in part, to at least one of the partitions and the first, second, and third address spaces such that the at least one change is capable of being carried out in the platform absent a reset of the platform.

5. The apparatus of claim 4, wherein:
    the at least one process is also to define, at least in part, the partitions and the first, second, and third address spaces.

6. The apparatus of claim 1, wherein:
    the at least one descriptor includes:
        at least one indicator to indicate, at least in part, the one or more locations in the third address space in which the at least one packet is located, at least in part; and
        at least one other indicator to indicate, at least in part, whether the at least one descriptor is intended to indicate, at least in part, one of storage of the at least one packet in the one or more locations in the third address space and completion of processing of the at least one packet by one of the processor core partitions.

7. The apparatus of claim 6, wherein:
    the at least one other indicator indicates, at least in part, the storage of the at least one packet in the one or more locations;
    the first processor core partition is to:
        store in the one or more locations the at least one packet, and the one or more locations is in a fourth address space in the third address space that is exclusively writable to by the first processor core partition,
        store in a lock-free queue, in the third address space, the at least one descriptor, and
        signal an interrupt to the second processor core partition after the at least one descriptor has been stored in the lock-free queue; and
    the second processor core partition is to:
        in response, at least in part, to the signaling of the interrupt by the first processor core partition, read the at least one descriptor from the lock-free queue,
        read, based at least upon the at least one descriptor, the at least one packet from the one or more locations.

8. The apparatus of claim 6, wherein:
    the at least one other indicator indicates, at least in part, the completion of processing of the at least one packet by the second processor core partition;
    the second processor core partition is to:
        store in a lock-free queue the at least one descriptor, and
        signal an interrupt to the first processor core after the at least one descriptor has been stored in the lock-free queue; and
    the first processor core partition is to:
        allocate the one or more locations for storage of the at least one packet, and the one or more locations is in a fourth address space in the third address space that is exclusively writable to by the first processor core partition;
        in response, at least in part, to the signaling of the interrupt by the second processor core partition, read the at least one descriptor from the lock-free queue, and
        based at least in part upon the at least one descriptor, de-allocate the one or more locations for the storage of the at least one packet.

9. The apparatus of claim 6, further comprising:
at least one transport layer process executed in the first processor core partition to initiate, at least in part, at least in part, transmission of the at least one packet; and
at least one other transport layer process executed in the second processor core partition to receive, at least in part, the at least one packet.

10. The apparatus of claim 1, wherein:
the platform is coupled to another platform via one or more communication links.

11. A method comprising:
providing a first memory address space exclusively and coherently accessible by a first processor core partition in a platform, the first processor core partition including one or more processor cores;
providing a second memory address space exclusively and coherently accessible by a second processor core partition in the platform, the second processor core partition including one or more other processor cores; and
providing a third memory address space in the platform that is accessible, at least in part, by both the first and second processor core partitions and permitting communication between the first and second processor core partitions of at least one packet and at least one descriptor associated with the at least one packet, the at least one descriptor indicating, at least in part, one or more locations in the third address space to store, at least in part, the at least one packet, the third address space including single-reader/single-writer queues, at least one of the queues to store the at least one descriptor, the queues including first and second single-reader/single-writer queues, the first processor core partition being exclusively permitted to read from the first single-reader/single-writer queue, the second processor core partition being exclusively permitted to read from the second single-reader/single-writer queue.

12. The method of claim 11, wherein:
the platform includes the first, second, and third address spaces; and
the first processor core partition includes a plurality of processor cores to coherently access the first address space.

13. The method of claim 11, wherein:
the first processor core partition includes a first processor core, a first memory that comprises the first address space, a first memory controller associated with the first memory, and a first input/output (I/O) hub;
the second processor core partition includes a second processor core, a second memory that comprises the second address space, a second memory controller associated with the second memory, and a second I/O hub; and
the platform comprises a point-to-point packet communication network to communicatively couple the first processor core partition to the second processor core partition.

14. The method of claim 11, further comprising:
initiating by at least one process at least one change, at least in part, to at least one of the partitions and the first, second, and third address spaces; and
carrying out the at least one change in the platform absent a reset of the platform.

15. The method of claim 14, wherein:
the at least one process is also to define, at least in part, the partitions and the first, second, and third address spaces.

16. The method of claim 11, wherein:
the at least one descriptor includes:
at least one indicator to indicate, at least in part, the one or more locations in the third address space in which the at least one packet is located, at least in part; and
at least one other indicator to indicate, at least in part, whether the at least one descriptor is intended to indicate, at least in part, one of storage of the at least one packet in the one or more locations in the third address space and completion of processing of the at least one packet by one of the processor core partitions.

17. The method of claim 16, wherein:
the at least one other indicator indicates, at least in part, the storage of the at least one packet in the one or more locations;
the first processor core partition is to:
store in the one or more locations the at least one packet, and the one or more locations is in a fourth address space in the third address space that is exclusively writable to by the first processor core partition,
store in a lock-free queue, in the third address space, the at least one descriptor, and
signal an interrupt to the second processor core partition after the at least one descriptor has been stored in the lock-free queue; and
the second processor core partition is to:
in response, at least in part, to the signaling of the interrupt by the first processor core partition, read the at least one descriptor from the lock-free queue,
read, based at least upon the at least one descriptor, the at least one packet from the one or more locations.

18. The method of claim 16, wherein:
the at least one other indicator indicates, at least in part, the completion of processing of the at least one packet by the second processor core partition;
the second processor core partition is to:
store in a lock-free queue the at least one descriptor, and
to signal an interrupt to the first processor core after the at least one descriptor has been stored in the lock-free queue; and
the first processor core partition is to:
allocate the one or more locations for storage of the at least one packet, and the one or more locations is in a fourth address space in the third address space that is exclusively writable to by the first processor core partition;
in response, at least in part, to the signaling of the interrupt by the second processor core partition, read the at least one descriptor from the lock-free queue, and
based at least in part upon the at least one descriptor, de-allocate the one or more locations for the storage of the at least one packet.

19. The method of claim 16, wherein:
at least one transport layer process executed in the first processor core partition initiates, at least in part, at least in part, transmission of the at least one packet; and
at least one other transport layer process executed in the second processor core partition receives, at least in part, the at least one packet.

20. The method of claim 11, wherein:
the platform is coupled to another platform via one or more communication links.

21. Machine-readable memory storing one or more instructions that when executed by a machine result in execution of operations comprising:
providing a first memory address space exclusively and coherently accessible by a first processor core partition in a platform, the first processor core partition including one or more processor cores;

providing a second memory address space exclusively and coherently accessible by a second processor core partition in the platform, the second processor core partition including one or more other processor cores; and providing a third memory address space in the platform that is accessible, at least in part, by both the first and second processor core partitions and permitting communication between the first and second processor core partitions of at least one packet and at least one descriptor associated with the at least one packet, the at least one descriptor indicating, at least in part, one or more locations in the third address space to store, at least in part, the at least one packet, the third address space including single-reader/single-writer queues, at least one of the queues to store the at least one descriptor, the queues including first and second single-reader/single-writer queues, the first processor core partition being exclusively permitted to read from the first single-reader/single-writer queue, the second processor core partition being exclusively permitted to read from the second single-reader/single-writer queue.

22. The memory of claim 21, wherein:
the platform includes the first, second, and third address spaces; and
the first processor core partition includes a plurality of processor cores to access the first address space.

23. The memory of claim 21, wherein:
the first processor core partition includes a first processor core, a first memory that comprises the first address space, a first memory controller associated with the first memory, and a first input/output (I/O) hub;
the second processor core partition includes a second processor core, a second memory that comprises the second address space, a second memory controller associated with the second memory, and a second I/O hub; and
the platform comprises a point-to-point packet communication network to communicatively couple the first processor core partition to the second processor core partition.

24. The memory of claim 21, wherein the operations further comprise:
initiating by at least one process at least one change, at least in part, to at least one of the partitions and the first, second, and third address spaces; and
carrying out the at least one change in the platform absent a reset of the platform.

25. The memory of claim 24, wherein:
the at least one process is also to define, at least in part, the partitions and the first, second, and third address spaces.

26. The memory of claim 21, wherein:
the at least one descriptor includes:
at least one indicator to indicate, at least in part, the one or more locations in the third address space in which the at least one packet is located, at least in part; and
at least one other indicator to indicate, at least in part, whether the at least one descriptor is intended to indicate, at least in part, one of storage of the at least one packet in the one or more locations in the third address space and completion of processing of the at least one packet by one of the processor core partitions.

27. The memory of claim 26, wherein:
the at least one other indicator indicates, at least in part, the storage of the at least one packet in the one or more locations;
the first processor core partition is to:
store in the one or more locations the at least one packet, and the one or more locations is in a fourth address space in the third address space that is exclusively writable to by the first processor core partition,
store in a lock-free queue, in the third address space, the at least one descriptor, and
signal an interrupt to the second processor core partition after the at least one descriptor has been stored in the lock-free queue; and
the second processor core partition is to:
in response, at least in part, to the signaling of the interrupt by the first processor core partition, read the at least one descriptor from the lock-free queue,
read, based at least upon the at least one descriptor, the at least one packet from the one or more locations.

28. The memory of claim 26, wherein:
the at least one other indicator indicates, at least in part, the completion of processing of the at least one packet by the second processor core partition;
the second processor core partition is to:
store in a lock-free queue the at least one descriptor, and
signal an interrupt to the first processor core after the at least one descriptor has been stored in the lock-free queue; and
the first processor core partition is to:
allocate the one or more locations for storage of the at least one packet, and the one or more locations is in a fourth address space in the third address space that is exclusively writable to by the first processor core partition;
in response, at least in part, to the signaling of the interrupt by the second processor core partition, read the at least one descriptor from the lock-free queue, and
based at least in part upon the at least one descriptor, de-allocate the one or more locations for the storage of the at least one packet.

29. The memory of claim 26, wherein:
at least one transport layer process executed in the first processor core partition initiates, at least in part, at least in part, transmission of the at least one packet; and
at least one other transport layer process executed in the second processor core partition receives, at least in part, the at least one packet.

30. The memory of claim 21, wherein:
the platform is coupled to another platform via one or more communication links.

* * * * *

UNITED STATES PATENT AND TRADEMARK OFFICE
CERTIFICATE OF CORRECTION

| | |
|---|---|
| PATENT NO. | : 7,650,488 B2 |
| APPLICATION NO. | : 12/141725 |
| DATED | : January 19, 2010 |
| INVENTOR(S) | : Annie Foong et al. |

It is certified that error appears in the above-identified patent and that said Letters Patent is hereby corrected as shown below:

In column 13, line 3-4, in Claim 9, before "transmission" delete "at least in part,".

In column 14, line 55-56, in Claim 19, before "transmission" delete "at least in part,".

In column 16, line 49-50, in Claim 29, before "transmission" delete "at least in part,".

Signed and Sealed this

Twenty-third Day of March, 2010

David J. Kappos
*Director of the United States Patent and Trademark Office*